United States Patent
Gerhard et al.

(10) Patent No.: US 7,747,944 B2
(45) Date of Patent: Jun. 29, 2010

(54) SEMANTICALLY APPLYING STYLE TRANSFORMATION TO OBJECTS IN A GRAPHIC

(75) Inventors: Lutz Gerhard, Seattle, WA (US); Georg F. Petschnigg, Seattle, WA (US); John R. Schilling, Seattle, WA (US); Thomas C. Underhill, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/172,279

(22) Filed: Jun. 30, 2005

(65) Prior Publication Data
US 2007/0006073 A1   Jan. 4, 2007

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00  | (2006.01) |

(52) U.S. Cl. .................. 715/236; 715/249; 715/760
(58) Field of Classification Search .............. 715/517, 715/760
See application file for complete search history.

(56) References Cited

U.S. PATENT DOCUMENTS

| 5,214,755 A | 5/1993 | Mason ................. 715/521 |
| 5,426,729 A | 6/1995 | Parker | |
| 5,557,722 A * | 9/1996 | DeRose et al. .......... 715/234 |
| 5,596,691 A * | 1/1997 | Good et al. ............. 345/440 |
| 5,619,631 A | 4/1997 | Schott | |
| 5,649,216 A | 7/1997 | Sieber ................... 715/506 |
| 5,669,006 A | 9/1997 | Joskowicz et al. ...... 715/517 |
| 5,818,447 A | 10/1998 | Wolfe et al. ............ 345/335 |
| 5,903,902 A | 5/1999 | Orr et al. ............... 707/517 |

(Continued)

FOREIGN PATENT DOCUMENTS

EP   0 431 638 A1   6/1991

(Continued)

OTHER PUBLICATIONS

"Styling Nested Lists," [online] Oct. 19, 2003 [accessed Nov. 13, 2006], SimpleBits, LLC, Retrieved from Internet <URL: http://www.simplebits.com/notebook/2003/10/19/styling_nested_lists.html>, pp. 1-5.*

(Continued)

*Primary Examiner*—Joshua D Campbell
*Assistant Examiner*—Stephen Alvesteffer
(74) *Attorney, Agent, or Firm*—Merchant & Gould, P.C.

(57) ABSTRACT

A graphics software program automatically generates a style transformation scheme for graphics. The graphics software program receives a selection of a style transformation and a semantic model describing a graphic. The graphics software program assigns style values for different objects of the graphic according to the style transformation and semantic model. A data structure is provided for a style transformation definition created to assign the style values to the objects of the graphic.

22 Claims, 7 Drawing Sheets

U.S. PATENT DOCUMENTS

| | | | | |
|---|---|---|---|---|
| 5,909,220 | A | 6/1999 | Sandow | 345/431 |
| 5,956,737 | A | 9/1999 | King et al. | 705/517 |
| 5,999,731 | A | 12/1999 | Yellin et al. | |
| 6,057,842 | A | 5/2000 | Knowlton et al. | 345/348 |
| 6,057,858 | A | 5/2000 | Desrosiets | 345/467 |
| 6,081,816 | A | 6/2000 | Agrawal | 715/521 |
| 6,166,738 | A | 12/2000 | Robertson et al. | |
| 6,173,286 | B1 | 1/2001 | Gutman et al. | 707/100 |
| 6,189,132 | B1 | 2/2001 | Heng et al. | 716/11 |
| 6,204,859 | B1 | 3/2001 | Jouppi et al. | 345/431 |
| 6,256,650 | B1 | 7/2001 | Cedar et al. | |
| 6,289,502 | B1 | 9/2001 | Garland et al. | |
| 6,289,505 | B1 | 9/2001 | Goebel | |
| 6,301,704 | B1 | 10/2001 | Chow et al. | |
| 6,305,012 | B1 | 10/2001 | Beadle et al. | |
| 6,308,322 | B1 | 10/2001 | Serocki et al. | |
| 6,324,686 | B1 | 11/2001 | Komatsu et al. | |
| 6,405,225 | B1 | 6/2002 | Apfel et al. | 707/526 |
| 6,667,750 | B1 | 12/2003 | Halstead et al. | 715/788 |
| 6,826,727 | B1 | 11/2004 | Mohr et al. | 715/517 |
| 6,944,818 | B2 | 9/2005 | Card et al. | 361/685 |
| 6,944,830 | B2 | 9/2005 | Card et al. | 715/853 |
| 7,055,095 | B1 | 5/2006 | Anwar | 707/517 |
| 7,107,525 | B2 | 9/2006 | Purvis | 715/517 |
| 7,178,102 | B1* | 2/2007 | Jones et al. | 715/235 |
| 7,348,982 | B2 | 3/2008 | Schorr et al. | 345/441 |
| 7,379,074 | B2 | 5/2008 | Gerhard et al. | |
| 7,423,646 | B2 | 9/2008 | Saini et al. | |
| 2001/0051962 | A1 | 12/2001 | Plotkin | 707/522 |
| 2002/0065852 | A1* | 5/2002 | Hendrickson et al. | 707/517 |
| 2002/0111969 | A1 | 8/2002 | Halstead, Jr. | |
| 2003/0079177 | A1 | 4/2003 | Brintzenhofe et al. | 715/500 |
| 2004/0111672 | A1 | 6/2004 | Bowman et al. | 715/513 |
| 2004/0133854 | A1 | 7/2004 | Black | 715/517 |
| 2004/0148571 | A1 | 7/2004 | Lue | 715/514 |
| 2004/0205602 | A1 | 10/2004 | Croeni | 715/517 |
| 2005/0007382 | A1 | 1/2005 | Schowtka et al. | 345/619 |
| 2005/0091584 | A1* | 4/2005 | Bogdan et al. | 715/514 |
| 2005/0094206 | A1 | 5/2005 | Tonisson | |
| 2005/0132283 | A1 | 6/2005 | Diwan et al. | 715/517 |
| 2005/0157926 | A1 | 7/2005 | Moravec et al. | 382/173 |
| 2005/0273730 | A1 | 12/2005 | Card et al. | 345/440 |
| 2005/0289466 | A1 | 12/2005 | Chen | 715/731 |
| 2006/0064642 | A1 | 3/2006 | Iyer | 715/730 |
| 2006/0066627 | A1 | 3/2006 | Gerhard et al. | 345/593 |
| 2006/0066631 | A1 | 3/2006 | Schorr et al. | 345/619 |
| 2006/0700005 | | 3/2006 | Gilbert | 715/763 |
| 2006/0209093 | A1 | 9/2006 | Berker et al. | 345/660 |
| 2006/0212801 | A1 | 9/2006 | Berker et al. | 715/513 |
| 2006/0277476 | A1* | 12/2006 | Lai | 715/760 |
| 2006/0294460 | A1 | 12/2006 | Chao et al. | 715/521 |
| 2007/0055939 | A1 | 3/2007 | Furlong et al. | 715/731 |
| 2007/0112832 | A1 | 5/2007 | Wong | |
| 2008/0046803 | A1* | 2/2008 | Beauchamp et al. | 715/212 |
| 2008/0136822 | A1 | 6/2008 | Schorr et al. | 345/441 |
| 2008/0282147 | A1 | 11/2008 | Schorr | |
| 2008/0288916 | A1 | 11/2008 | Tazoe | |
| 2009/0019453 | A1 | 1/2009 | Kodaganur | |
| 2009/0327954 | A1 | 12/2009 | Danton | |

FOREIGN PATENT DOCUMENTS

| | | |
|---|---|---|
| EP | 1 111 543 A2 | 6/2001 |
| EP | 1 111 543 A3 | 6/2001 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

Gallant, John and Bergevin, Holly. Archive.org archive of "CSS Flyouts—Part One," [online] Jun. 24, 2005 [accessed Nov. 13, 2006], CommunityMX, Retrieved from Internet <URL: http://web.archive.org/web/20050624075147/http://www.communitymx.com/content/article.cfm?page=3&cid=55A69>.*

Css Zen Garden, retrieved from Archive.org. <http://web.archive.org/web/20031001180317/http://www.csszengarden.com/>. Oct. 1, 2003. Retrieved Nov. 8, 2009.*

EP Patent Application No. 05-108-658.5-2218 Search Report dated Feb. 13, 2006.

European Search Report for EP 05 10 5366.8-2218, Jan. 2, 2006.

Extended European Search Report for EP 05 10 8636.1-2218, Jan. 2, 2006.

Roderick Singleton, "OpenOffice.org User Guide for Version 1.1,X", May 7, 2004, Online, XP002348571; retrieved from the Internet: URL:www.openoffice.org>, retrieved Sep. 30, 2005; pp. 253-284.

"Proquis Compliance Management & Document Control Solutions"; http://wwws.proquis.com/allclear-text2chart.asp, 1 page, Jul. 18, 2005.

"Exploring the Layouts", 1999 software Publishing Corporation, 2 pgs.

"Create Diagrams in Word 2002, Excel 2002, and PowerPoint 2002"; http://office.microsoft.com/en-us/assistance/HA010346141033.aspx, 3pgs.

Anonymous: "Extract of Online-Help for OpenOffice Impress (Stylist)", Ver. 1.1.5, German Version, online, Apr. 2004 (English Translation).

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 21 pgs.

Russell Borland, "Running Microsoft Word 97", 1997, Published by Microsoft Press, Pertinent pp. 60-61 (0247us01).

YEd Graph Editor—Published Date: 2009; New yEd version 3.4.1—http://www.yworks.com/en/products_yed_about.html.

LingCh by Elod Csirmaz—Retrieved Date: Jan. 11, 2010—http://www.postminart.org/csirmaz/lingch.txt.

* cited by examiner

US 7,747,944 B2

SEMANTICALLY APPLYING STYLE TRANSFORMATION TO OBJECTS IN A GRAPHIC

BACKGROUND

Visual aids help people understand information. Conveying information to or among groups of people almost necessarily requires creating visual presentations. These visual presentations generally provide graphical content to the user's choice of media, e.g. text or audio. Computer programs, such as the Microsoft® PowerPoint® presentation application, have helped automate the task of creating such graphical content. Such graphics programs generally allow users to convey information more efficiently and effectively by putting that information in easily understandable formats and contexts.

Graphical content contains information that can have both textual and graphical characteristics. Textual characteristics generally refer to the written matter within the graphical content. Graphical characteristics generally refer to the pictorial or other visual features of the graphical content. Depending on the information and the audience, the user generally determines a visual diagram that will best teach or convey the underlying information. Then, the user tries to create the diagram that the user has decided to use. Unfortunately, creating graphical content in prior art graphics applications and programs can be extremely cumbersome and time consuming.

Graphics programs and applications generally create visual diagrams in less user-friendly processes. The graphics programs generally force the user to create a diagram piece by piece. In other words, the user must select and place every graphical element within the presentation. Once an element is in the diagram, the user can edit the element for format and content. The user enters any text into or onto the element. The user changes the shape, position, size, or other formatting. When the user needs to add more information to the presentation, the user must add more elements and edit those elements for their content and visual appearance.

As the diagram grows in complexity, the diagram may require changes to previously added elements to accommodate newer elements. The process of creating a diagram generally requires a great deal of time to manipulate the diagram to manufacture a final presentation. Formatting shapes in the diagram to correctly map to content can be tedious and time consuming. The user may expend a lot of time manipulating formatting values to create a unique diagram of designer quality. In addition, the process is very awkward for the user because the user must determine which diagram to use before creating the diagram. If the user does not first determine a diagram to create, the user could spend even more time redrawing the diagram before settling on a final presentation. Eventually, the user stops focusing on the diagram's message and gets caught up in how the diagram looks.

SUMMARY

The present invention relates to a novel graphics software application or program. The graphics application comprises embodiments directed toward the semantic application of style transformation to objects in a graphic. In one embodiment, a method for applying style transformation to objects in a graphic includes receiving a semantic model for the graphic. The semantic model is a data structure describing the layout and organization of the graphic. The method automatically assigns style transformation values for objects of the graphic. The style transformation may be applied to all types of layouts and diagrams due to the underlying semantic model.

In another embodiment of the present invention, a user interface receives a semantic model for the graphic. The semantic model, in one embodiment, is created automatically from user input. The user interface receives a style transformation selection for the graphic. The style transformation selection directs the graphics program to retrieve a style transformation model to apply to objects of the semantic model. The style transformation selection applies formatting based on pre-defined choices that map to the semantic model. The user interface displays the graphic with style values automatically assigned for the objects of the graphic. The style values assigned to the objects may include values for line, fill, effect, and scene.

The present invention also comprises embodiments of a data structure for a style transformation definition. The data structure comprises one or more data fields. A first data field contains data specifying one or more objects of a semantic model that receives a style transformation. A second data field contains data applying the style transformation application method or model. A third field functions to assign a style value (e.g., line, fill, effect, scene) to the one or more objects of the semantic model in the first data field according to the style transformation application method or model in the second data field.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art.

The present invention provides methods and systems for semantically transforming the style of objects in a graphic. The transformation may be any type of visual characteristic change. The present invention is explained with embodiments applied to diagram structure, but the present invention is not limited to the embodiments described herein, as one skilled in the art will recognize. A graphic is any visual representation of information. In exemplary embodiments of the present invention, the graphic is a diagram, such as a flow chart, an organizational chart, a pie chart, a cycle chart, etc. While the present invention will be described with reference to transforming the style of objects in a graphic represented by a diagram, the present invention is not limited to the embodiments described herein.

Figure 1:
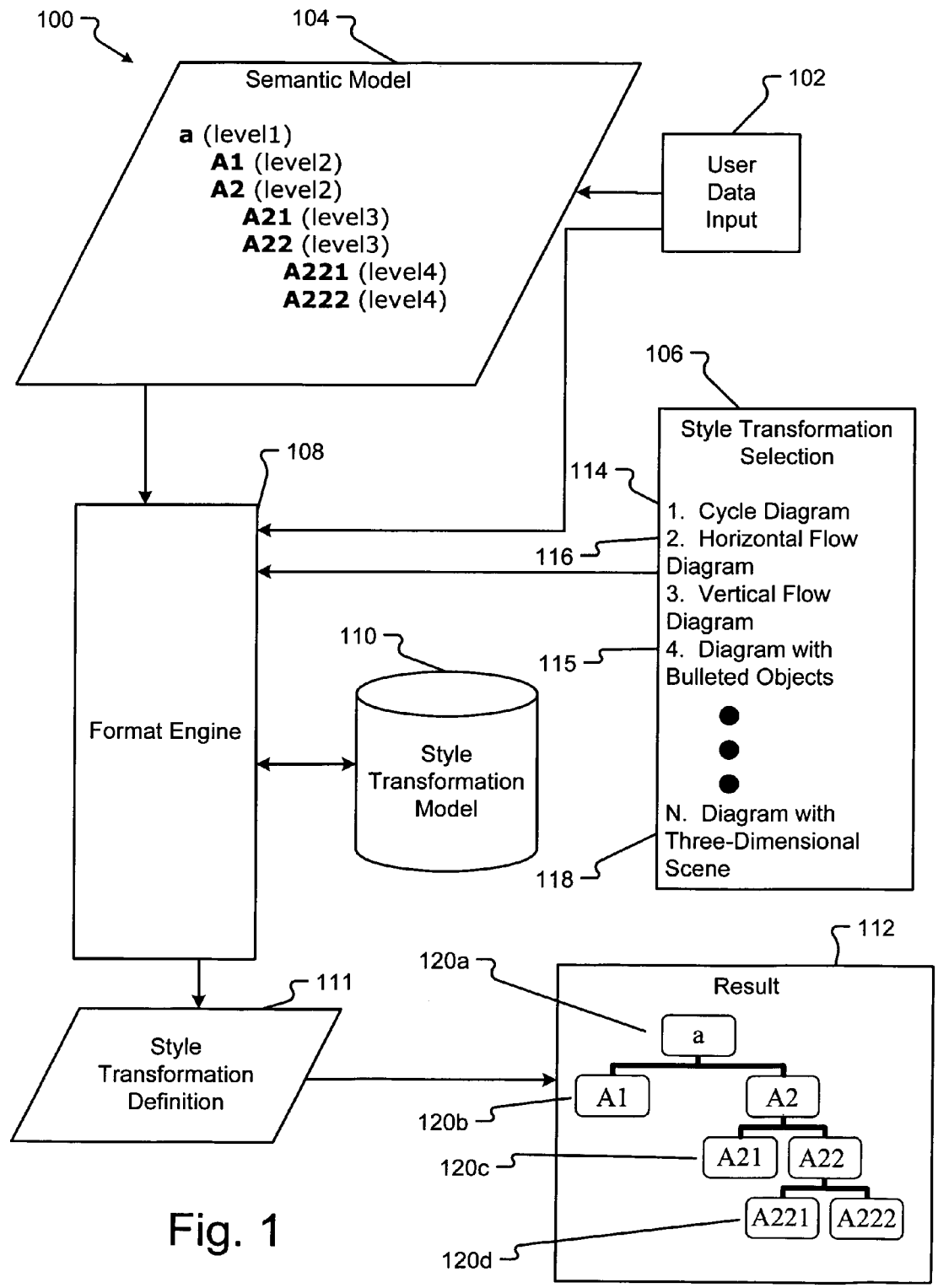
FIG. 1 is an exemplary embodiment of a graphics formatting system for semantically applying style transformation to objects in a graphic according to the present invention.

An embodiment of the present invention for a system 100 for semantically transforming the style of objects in a graphic is shown in FIG. 1. The user provides data input 102 to create a graphic. A semantic model 104 is created from the data input 102. The semantic model 104 is a data embodiment that describes the layout, organization, and/or the structure of a graphic. The semantic model 104 establishes a hierarchical structure of objects in a graphic. In one embodiment, the hierarchical relationship established by the semantic model 104 is created by indenting object names such that lower level objects are indented in relation to higher level objects. As shown in the present example, the semantic model 104 provides for a graphic of four levels 120a, 120b, 120c, and 120d, wherein item "a" is a top level 120a, items "A1" and "A2" are at the same level 120b under item "a", items "A21" and "A22" are at the same level 120c under item "A2", and items "A221" and "A222" are at the same level 120d under item "A22". The hierarchical relationships established between the objects in the semantic model 104 can be used by the present invention to transform the style of objects in a displayed graphic. For a more detailed description of semantic models and graphics generated with semantic models, please refer to the following related applications: U.S. patent application Ser. No. 10/957,103, entitled "EDITING THE TEXT OF AN ARBITRARY GRAPHIC VIA A HIERARCHICAL LIST" filed on Sep. 30, 2004; U.S. patent application Ser. No. 10/955,271, entitled "METHOD, SYSTEM, AND COMPUTER-READABLE MEDIUM FOR CREATING AND LAYING OUT A GRAPHIC WITHIN AN APPLICATION PROGRAM" filed on Sep. 30, 2004; and U.S. patent application Ser. No. 11/013,630, entitled "SEMANTICALLY APPLYING FORMATTING TO A PRESENTATION MODEL" filed on Dec. 15, 2004. The three aforementioned patent applications are assigned to the Microsoft Corporation of Redmond, Wash., and are expressly incorporated herein in their entirety, by reference.

The semantic model 104 is input into the format engine 108. The user also selects a style transformation 106. Upon selecting the style transformation 106, the format engine 108 retrieves a style transformation model 110 from a data store. In one embodiment, style transformation models are created by a designer using style values to determine how a graphic is rendered on a display. Applying the style transformation model 110 to the semantic model 104, the format engine 108 determines the style values for the semantic model 104. The style values may correspond to values for line, fill, effect and scene (e.g., two or three-dimensional scene). In one embodiment, the values for line, fill and effect may be accessed from a style matrix that is mapped to the semantic model 104. The appearance of an object in the graphic may be determined by the corresponding style values in the style matrix that the object is mapped to. Different objects in the same graphic may correspond to different style values in the style matrix such that different objects in the same graphic have a different appearance. For example, a three-dimensional effect may be applied to top-level objects, and no effect may be applied to lower level objects. The determined style values are assigned to the objects of the graphic, and the format engine 108 outputs a style transformation definition 111. The style transformation definition is then used to render the graphic result 112. The system and method for semantically transforming the style of objects in a graphic is described in more detail below.

Figure 2:
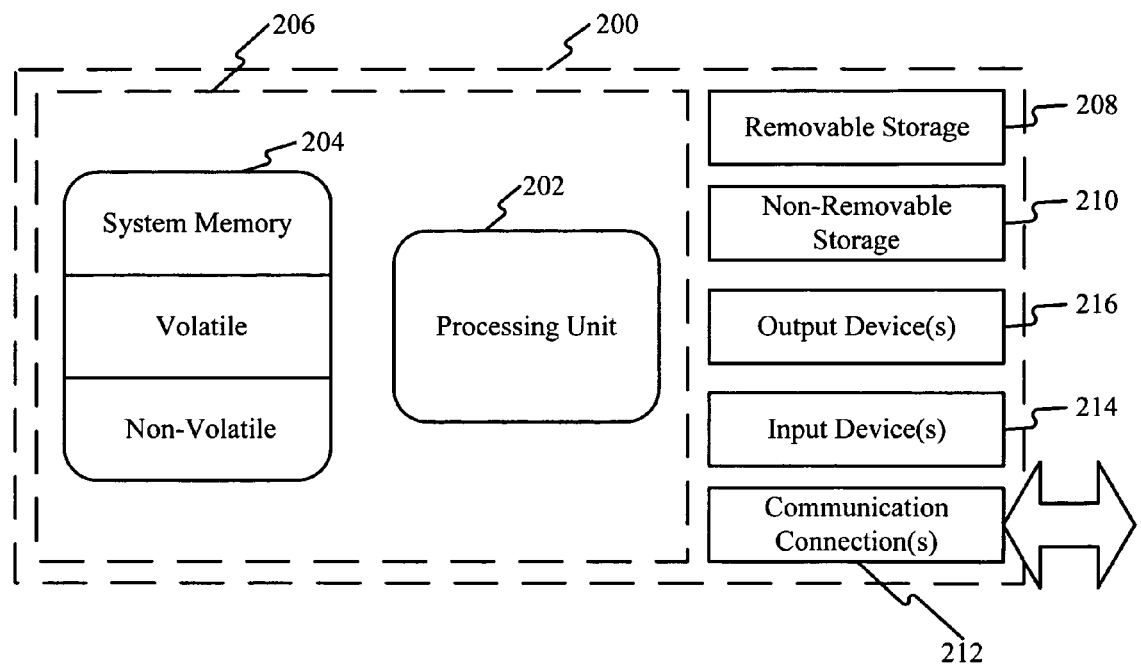
FIG. 2 is a functional diagram illustrating a computing environment and a basic computing device that can operate the style transformation system according to the present invention.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206. Additionally, device 200 may also have additional features or functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 214 may help form the user interface 102 discussed above while devices 216 may display results 112 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers (not shown). The remote computer may be a personal computer, a server computer system, a router, a network PC, a peer device, or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application program may reside on a memory device connected to the remote computer system. It will be appreciated that the network connections explained are exemplary and other means of establishing a communications link between the computers may be used.

Figure 3:
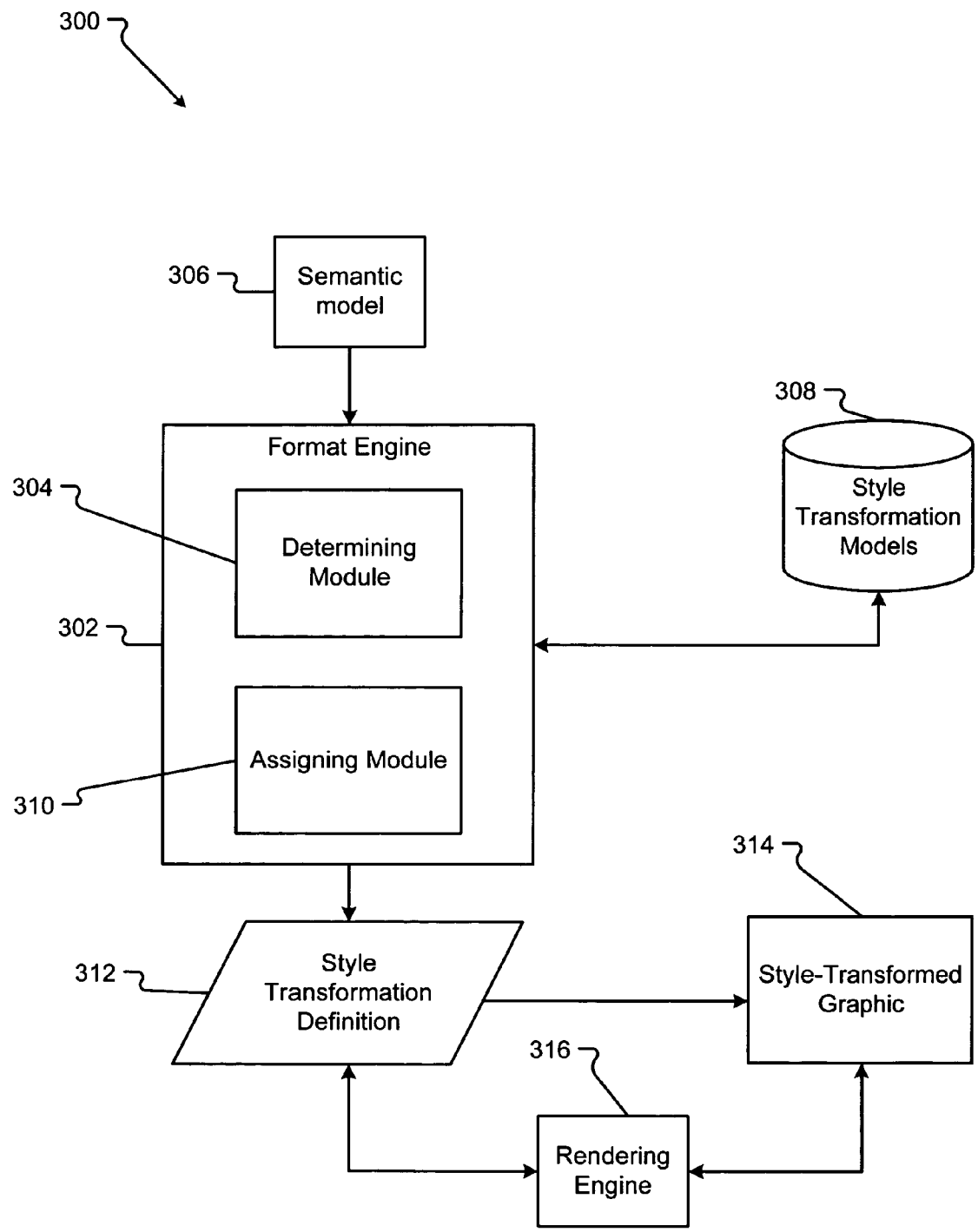
FIG. 3 is a functional diagram to an embodiment of the present invention illustrating the components of a graphics application according to the present invention.

An exemplary embodiment of a system 300 for semantically transforming the style of objects in a graphic is shown in FIG. 3. In this exemplary embodiment, the formatting of a diagram is transformed. The system 300 uses a format engine 302 to semantically transform the style of data objects and/or graphics objects. In one embodiment, the data entered by the user, such as data input 102 (FIG. 1), creates a semantic model 306 that is stored in system memory. The semantic model 306 contains identifications for objects of the graphic. For example, determining module 304 identifies every node or transition within the graphic, such as a shape or an arrow. The semantic model 306 may also include the type of shape used, the position of the shape, the size of the shape, etc.

In this embodiment, the format engine 302 has a determining module 304 and an assigning module 310. The determining module 304 determines the style of the graphic. For example, if the graphic is an organizational chart with three levels, the determining module 304 determines that the graphic has three levels. In one embodiment, the determining module 304 receives the semantic model 306. As explained above, the semantic model 306 describes the organization and layout of a graphic. For example, the semantic model 306 lists the levels within a graphic and the number of elements within each level. The semantic model 306 therefore delineates the objects of the graphic. The determination module 304 parses the semantic model 306 and determines various characteristics about the semantic model 306, such as the hierarchical structure of the semantic model 306, how many elements are in the semantic model 306, etc. These characteristics may then be used by the assigning module 310 to assign a style to the objects of the graphic created based on the semantic model 306.

The assigning module 310 also has access to the style transformation models 308. In particular, when a user selects a particular style transformation, such as described in conjunction with FIG. 1, e.g. selection 106, the assigning module 310 has access to or receives information related to the selection. Upon receiving the selection for style transformation, the format engine 302 retrieves a style transformation model 308 from a data store. The style transformation model 308 is a mathematical model used for the selected style transformation on the type of graphic in the semantic model. In other words, every style transformation is calculated in a predetermined manner depending on the diagram and on the user's choice of style transformation. In one embodiment, the style transformation model 308 is created by a designer. The assigning module 310 applies the style transformation model 308 to the graphic from the semantic model 306. Thus, the graphic is automatically determined to have a certain style.

The assigning module 310 assigns the determined style to the objects of the graphic. In one embodiment, the assigning module 310 uses object identifications of the graphic to create a style transformation definition 312. The style transformation definition 312 contains the style definitions for every element identified in the semantic model 306. In embodiments of the present invention, some of the definitions include line, fill, effect, and scene definitions. Upon determining the style for the elements of the semantic model 306, the assigning module 310 creates a style transformation definition 312 and stores it with new style definitions for objects of the graphic. A style definition is a data element that provides the display with information on how to display the graphic. The style transformation definition 312 is used to render a style-transformed graphic 314 in the user's display device. The style definitions are dependent upon the style model used.

In a further embodiment, the present invention may include a rendering engine 316. The rendering engine 316 renders the style-transformed graphic 314. In one embodiment, the rendering engine 316 determines the shapes, transitions, and other elements of the style-transformed graphic 314 from the semantic model 306. Using the identification tags within the semantic model, the rendering engine 316 extracts formatting information from the style transformation definition 312. For example, the rendering engine 316 looks up the identification tag for all nodes within level three in the style transformation definition 312. The style settings for the nodes within level three may be the same. Thus, the rendering engine 316 formats every node within level three with the style provided by the setting in the style transformation definition 312.

Figure 4A:
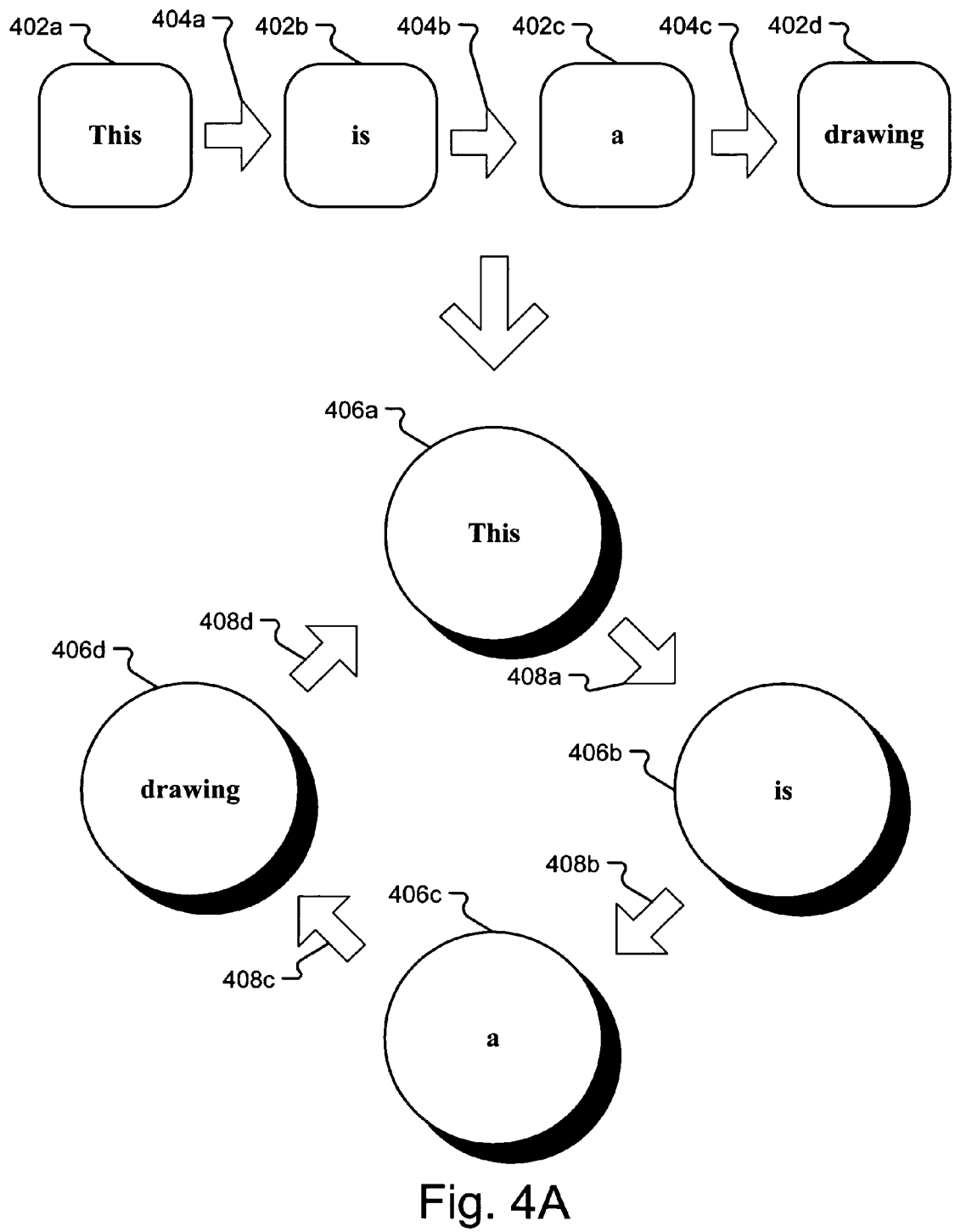
FIG. 4A illustrates a style transformation applied to objects in a graphic according to one aspect of the present invention.
Figure 4B:
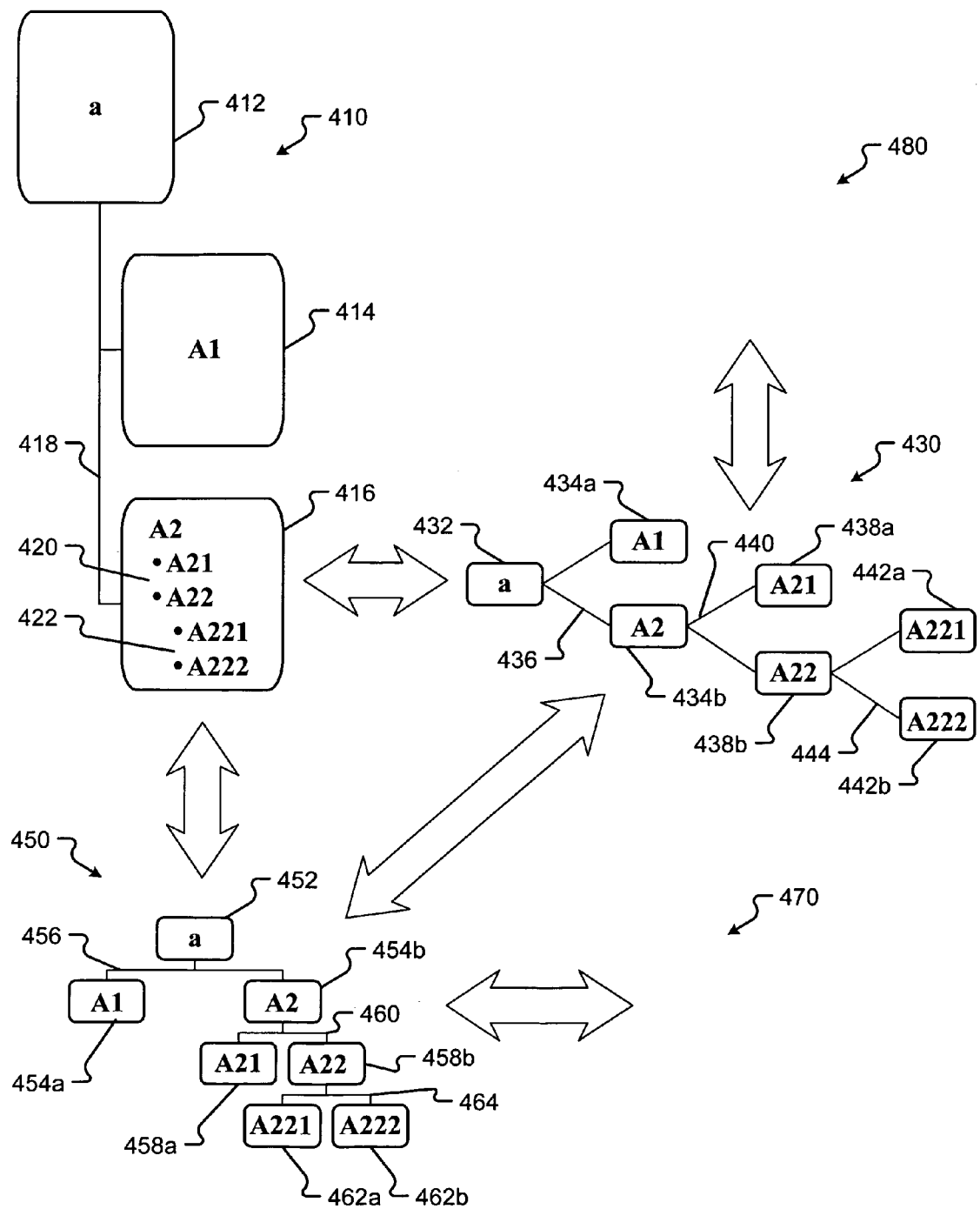
FIG. 4B illustrates a style transformation applied to objects in a graphic according to one aspect of the present invention.

Exemplary embodiments of style transformations are shown in FIG. 4A and FIG. 4B. In a first embodiment, a style transformation applied to objects in a graphic is shown in FIG. 4A. The four shapes 402a, 402b, 402c and 402d correspond to four nodes. Each node is associated with a format setting or value. In one embodiment of the present invention, the format value may include any setting for line, fill, effect, and scene.

If a user selects a style transformation that changes the diagram structure of the graphic, such as selection 114 in FIG. 1, the present invention can automatically change the style of objects in the graphic. The semantic model for the graphic shown in FIG. 4A has a single level of nodes with the level containing four nodes. The diagram structure is linearly arranged with three connectors 404a, 404b, 404c linking the four shapes 402a, 402b, 402c, 402d. If the user chooses a style transformation selection (e.g., selection 114) that changes the diagram structure, the four nodes are assigned new format settings. For example, if the user selects a style transformation that changes formatting from a linear model to a circular model, the shapes 402a, 402b, 402c, 402d are transformed into shapes 406a, 406b, 406c, 406d by accessing the style matrix and assigning new values for line, fill, and effect for the objects of the graphic. Similarly, connectors 404a, 404b, 404c are transformed into connectors 408a, 408b 408c. Connector 408d is added between nodes 406a and 406d to complete the circular path.

Some objects are mapped differently to the semantic model than other objects. For example, connectors are mapped differently to the semantic model than shapes. The semantic model identifies the connectors as being less important than shapes. Thus, the connectors may be assigned different values for line, fill and effect than the shapes. For example, shapes 406a, 406b, 406c, 406d may be assigned a shadow effect, while connectors 408a, 408b, 408c, 408d are not assigned any effect. Thus, the connectors may be visually de-emphasized relative to the shapes.

A next embodiment of a style transformation is shown in FIG. 4B. Several different style transformations of a diagram structure are shown. If a user selects a diagram structure change, such as selection 115, the format engine 108 (FIG. 1) retrieves a style transformation model for the diagram structure. Selection 115 corresponds to a diagram structure with bulleted objects as shown by graphic 410. The style associated with a diagram need not be changed because the style is independent of the diagram layout. Using the corresponding semantic model 104 and style matrix, the first level node is transformed into shape 412 with corresponding text displayed therein (e.g., "a"). The second level nodes are transformed into shapes 414, 416 with corresponding text displayed therein (e.g., "A1" and "A2"). Connector 418 links shape 412 to shapes 414, 416 such that the graphic is rendered with shapes 414, 416 displayed as being dependent on shape 412. The third level nodes 420 are displayed as indented, bulleted text elements within shape 416 below the second level node (i.e., "A2") on which the third level nodes 420 are dependent. Likewise, the fourth level nodes 422 are displayed as indented, bulleted text elements below the third level node (i.e., "A22") on which the fourth level nodes 422 are dependent.

A user may determine that the diagram with bulleted objects is inappropriate for a desired effect. The user may select a different style transformation selection, such as selection 116, to change the diagram structure of the graphic. Selection 116 corresponds to a horizontal flow diagram structure. Thus, the format engine 108 may transform the diagram structure to the horizontal diagram structure of graphic 430 by accessing the corresponding semantic model 104 and style transformation model 110. The top-level node is displayed as shape 432. Second-level nodes are displayed as shapes 434a, 434b and are linked as dependent on the top-level node via connector 436. Third-level nodes are displayed as shapes 438a, 438b and are linked as dependent on shape 434b via connector 440. Fourth-level nodes are displayed as shapes 442a, 442b and are linked as dependent on shape 434b via connector 444.

The top-level node is displayed as shape 452. Second-level nodes are displayed as shapes 454a, 454b and are linked as dependent on the top-level node via connector 456. Third-level nodes are displayed as shapes 458a, 458b and are linked as dependent on shape 454b via connector 460. Fourth-level nodes are displayed as shapes 462a, 462b and are linked as dependent on shape 458b via connector 464.

In another embodiment of the present invention, the user may choose a scene transformation, such as selection 118 (FIG. 1). In this embodiment, the format engine 108 automatically changes the scene settings from two-dimensional to three-dimensional. For example, graphic 450 (or 430) is displayed with a two-dimensional scene setting. To change the scene, the format engine 108 automatically transforms the planar orientation of the objects in the semantic model by changing a scene setting to display graphic 470 (or 480) such that shapes 472 (or 482) are displayed with a thickness that suggests a three-dimensional orientation. As discussed above, connectors 474 (or 484) are mapped differently to the semantic model than the shapes. Thus, a scene setting associated with the connectors may be unchanged such that the connectors remain in a two-dimensional scene orientation.

The layout of a diagram is two-dimensional and does not require three-dimensional information to create a three-dimensional scene. The style transformation uses semantic information (e.g., whether a shape is a node or a connector) to determine z-extrusion and z-position in three-dimensional space. Thus, three-dimensional scenes may be accurately generated even though the underlying layout engine is not provided with information about how to arrange objects in three-dimensional space.

Figure 5:
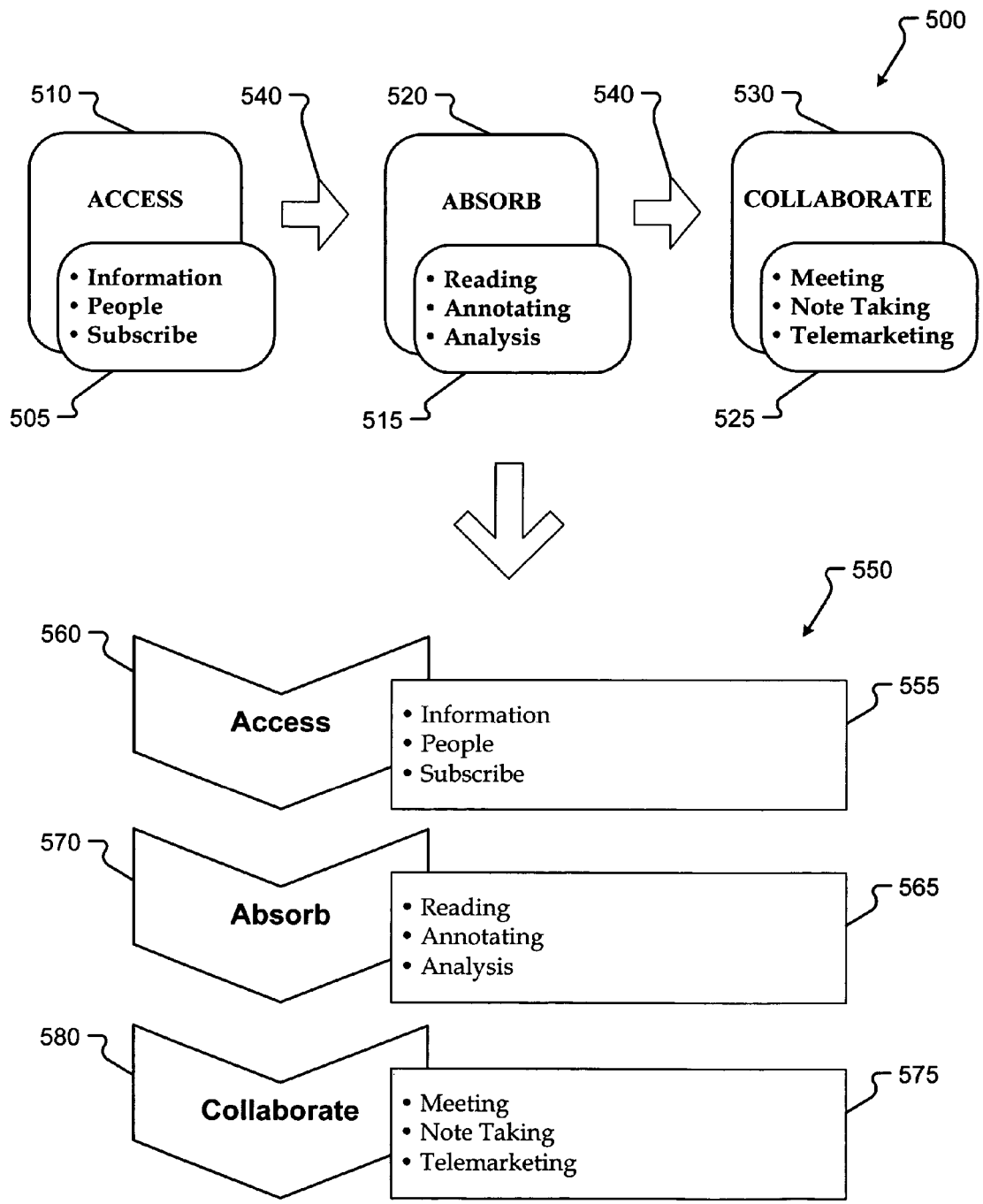
FIG. 5 illustrates a style transformation applied to objects in a graphic according to one aspect of the present invention.

In another embodiment of the present invention shown in FIG. 5, accent shapes are used in conjunction with main shapes to highlight portions of a graphic. The following semantic model establishes a relationship between main shapes and accent shapes:

Access (Accent1)
    Information (Main1)
    People (Main1)
    Subscribe (Main1)
    Absorb (Accent1)
    Reading (Main1)
    Annotating (Main1)
    Analysis (Main1)
    Collaborate (Accent1)
    Meeting (Main1)
    Note Taking (Main1)
    Telemarketing (Main1)

The semantic model links three main text strings to one accent text string. The main text strings may be associated with a main shape, and the accent text string may be associated with an accent shape. The main shape may correspond to a higher level object and the accent shape may correspond to a lower level object. In one embodiment, the accent shape may be positioned proximate the corresponding main shape. In another embodiment, the main shape may overlap the corresponding accent shape. In yet another embodiment, the accent shape may overlap the corresponding main shape. The layering order (i.e., z-order) of the objects may be determined from the corresponding semantic model.

Referring to graphic 500, main shapes 505, 515, 525 are associated with accent shapes 510, 520, 530, respectively.

Graphic 500 is displayed with the main shapes 505, 515, 525 overlapping the corresponding accent shapes 510, 520, 530. The shapes are linked via connectors 540. In one embodiment, connectors 540 are visually de-emphasized (e.g., have a smaller line thickness) in relation to the accent shapes 510, 520, 530 and the main shapes 505, 515, 525.

The user may transform the style of the objects in graphic 500 to produce graphic 550. Accent shapes 510, 520, 530 are transformed into accent shapes 560, 570, 580, and main shapes 505, 515, 525 are transformed into main shapes 555, 565, 575. The layering order of the objects is determined from the corresponding semantic model such that the main shapes 555, 565, 575 overlap the accent shapes 560, 570, 580. Graphic 550 is rendered without connectors.

Figure 6:
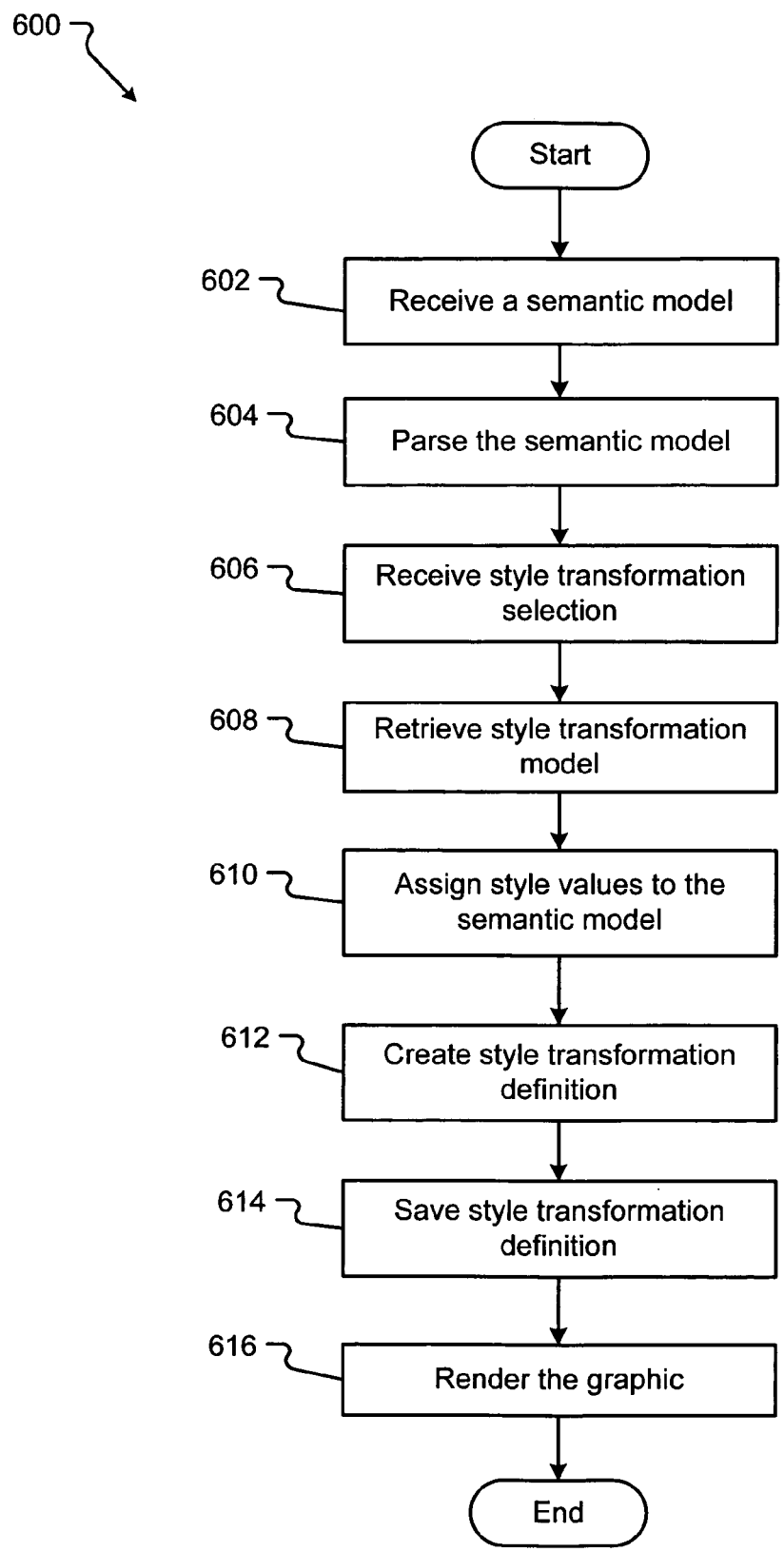
FIG. 6 is a flow diagram representing an embodiment of the present invention for semantically applying style transformation to objects in a graphic.

An embodiment of a method 600 for semantically applying a style transformation to objects in a graphic is shown in FIG. 6. Receive operation 602 receives a semantic model, such as semantic model 104 (FIG. 1). In one embodiment, a format engine, such as format engine 108 (FIG. 1), receives the semantic model. The semantic model provides information about the type of graphic, the number and types of nodes, connectors or elements within the graphic, and other information about the configuration and layout of the graphic.

Determine operation 604 parses the semantic model, evaluating the components for hierarchical evidence and other characteristics that might be relevant to variants in formatting. For instance, determine operation 604 may determine how many objects (e.g., shapes and connectors) are in the semantic model. Determine operation 604 may determine how many levels and/or sublevels exist between the objects. In one embodiment, determine operation 604 performs the analysis independent of the style transformation such that when the style is transformed, no new analysis need be done on an existing semantic model.

Receive operation 606 receives a user selected style transformation, such as selection 106 (FIG. 1). Retrieve operation 608 retrieves the selected style transformation model from a data store. Within the style transformation model, a mathematical model is expressed for computing the style values (e.g., line, fill, effect and/or scene) for the objects of the semantic model.

Upon determining the characteristics of the semantic model, assign operation 610 automatically assigns the style values to the semantic model such that the graphic is determined to have a certain style. In one embodiment, the format engine applies the mathematical model from the selected style transformation model to the objects in the semantic model. Create operation 612 creates a style transformation definition that describes to what and how to apply the selected style transformation model. Save operation 614 then saves the style transformation definition. Render operation 616 then renders the graphic using the style transformation definition, as discussed with reference to FIG. 3.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer implemented method for changing the style of a graphics chart, the method comprising:

generating a graphic chart in a first portion of a display of a diagramming application, wherein the graphic chart includes a parent graphic object, a child graphic object, and a transition graphic object;

automatically generating a semantic model based on the generated graphic chart in a second portion of a display of the diagramming application, the semantic model being configured to describe the organization of the graphic chart by displaying text strings of the graphic chart in a hierarchical format, wherein a parent text string of the parent graphic object is semantically indicated in the hierarchical format as a top level, wherein a child text string of the child graphic object is semantically indicated in the semantic model as a subordinate level indented in relation to the top level, wherein the transition graphic object is semantically indicated in the hierarchal format as connecting the top level to the subordinate level;

receiving a style transformation selection from a user interface;

accessing a style transformation model based on the style transformation selection, the style transformation model including style values for configuring the style of the graphics chart;

generating a style transformation definition, wherein the style transformation definition is generated by identifying the semantically indicated top level of the semantic model, identifying the semantically indicated subordinate level of the semantic model, and identifying the semantically indicated connection between the top level and the subordinate level, wherein a style value is determined from the style transformation model based on the semantically indicated top level of the semantic model, the semantically indicated subordinate level of the semantic model, and the semantically indicated connection between the top level and the subordinate level;

applying the generated style transformation definition to the graphic chart to render the graphic chart according to the style value of the style transformation definition, wherein the determined style value is applied to the parent graphic object, the child graphic object, and the transition graphic object;

receiving a first change to modify the subordinate level semantically indicated in the semantic model in the second portion of the display of the diagramming application, wherein, in response to the first change, automatically changing a position of the child graphic object in the graphic chart in the first portion of the display of the diagramming application; and receiving a second change to modify the child text string semantically indicated in the semantic model in the second portion of the display of the diagramming application, wherein, in response to the second change, automatically changing text of the child graphic object in the graphic chart in the first portion of the display of the diagramming application to reflect the second change.

2. The computer-implemented method of claim 1, wherein the style value is at least one member of a group comprising: a line value, a fill value, an effect value, and a scene value.

3. The computer-implemented method of claim 1, wherein generating a style transformation definition includes determining a first style value for the semantically indicated top level of the semantic model, determining a second style value for the semantically indicated subordinate level of the semantic model, and determining a third style value for the semantically indicated connection between the first level and the second level, wherein the first style value is applied to the parent graphic object, the second style value is applied to the child graphic object and the third style value is applied to the transition graphic object.

4. The computer-implemented method of claim 1, wherein the style transformation selection is a horizontal flow selection, wherein the style transformation model is a horizontal style transformation model, wherein a first horizontal position style value is determined for the semantically indicated top level of the semantic model, a second horizontal position style value is determined for the semantically indicated subordinate level of the semantic model, and a third horizontal position style value is determined for the semantically indicated connection between the first level and the second level, wherein the first horizontal position style value is applied to the parent graphic object, the second horizontal position style value is applied to the child graphic object, and the third horizontal position style value is applied to the transition graphic object.

5. The computer-implemented method of claim 1, wherein the style transformation selection is a vertical flow selection, wherein the style transformation model is a vertical style transformation model, wherein a first vertical position style value is determined for the semantically indicated top level of the semantic model, a second vertical position style value is determined for the semantically indicated subordinate level of the semantic model, and a third vertical position style value is determined for the semantically indicated connection between the first level and the second level, wherein the first vertical position style value is applied to the parent graphic object, the second vertical position style value is applied to the child graphic object, and the third vertical position style value is applied to the transition graphic object.

6. The computer-implemented method of claim 1, wherein the style transformation selection is a bullet flow selection, wherein the style transformation model is a bullet style transformation model, wherein a first bullet position style value is determined for the semantically indicated top level of the semantic model, and a second bullet position style value is determined for the semantically indicated subordinate level of the semantic model, wherein the first bullet position style value is applied to the parent graphic object, and the second bullet position style value is applied to the child graphic object.

7. The computer-implemented method of claim 1, wherein the style transformation selection is an accent flow selection, wherein the style transformation model is a accent style transformation model, wherein a first accent style value is determined for the semantically indicated top level of the semantic model, and a second accent style value is determined for the semantically indicated subordinate level of the semantic model, wherein the first accent style value is applied to the parent graphic object to cause the parent graphic object to be displayed as a first shape, and the second accent style value is applied to the child graphic object to cause the child graphic object to be displayed as a second shape.

8. The computer-implemented method of claim 1, wherein the style transformation selection is three-dimensional flow selection, wherein the style transformation model is a three-dimensional transformation model, wherein a three dimensional style value is determined for the semantically indicated top level of the semantic model, the semantically indicated subordinate level of the semantic model and the semantically indicated connection between the top level and the subordinate level, wherein the three-dimensional style value is applied to the parent graphic object, the child graphic object and the transition graphic object.

9. A computer-readable storage medium having computer-executable instructions for changing the style of a graphics chart, the instructions comprising:

generating a graphic chart in a first portion of a display on a diagramming application, wherein the graphic chart includes a parent graphic object, and a child graphic object;

automatically generating a semantic model based on the generated graphic chart in a second portion of a display of the diagramming application, the semantic model being configured to describe the organization of the graphic chart by displaying text strings of the graphic chart in a hierarchical format, wherein a parent text string of the parent graphic object is semantically indicated in the hierarchical format as a top level, wherein a child text string of the child graphic object is semantically indicated in the semantic model as a subordinate level indented in relation to the top level;

receiving a style transformation selection from a user interface;

accessing a style transformation model based on the style transformation selection, the style transformation model including style values for configuring the style of the graphics chart;

generating a style transformation definition, wherein the style transformation definition is generated by identifying the semantically indicated top level of the semantic model, and identifying the semantically indicated subordinate level of the semantic model, wherein a style value is determined from the style transformation model based on the semantically indicated top level of the semantic model, and the semantically indicated subordinate level of the semantic model;

applying the generated style transformation definition to the graphic chart to render the graphic chart according to the style value of the style transformation definition, wherein the determined style value is applied to the parent graphic object, and the child graphic object; and receiving a change to modify the subordinate level semantically indicated in the semantic model in the second portion of the display of the diagramming application, wherein, in response to the change, automatically changing a position of the child graphic object in the graphic chart in the first portion of the display of the diagramming application.

10. The computer-readable storage medium of claim 9, wherein the style value is at least one member of a group comprising: a line value, a fill value, an effect value, and a scene value.

11. The computer-readable storage medium of claim 9, wherein generating a style transformation definition includes determining a first style value for the semantically indicated top level of the semantic model, and determining a second style value for the semantically indicated subordinate level of the semantic model, wherein the first style value is applied to the parent graphic object, and the second style value is applied to the child graphic object.

12. The computer-readable storage medium of claim 9, wherein the style transformation selection is a horizontal flow selection, wherein the style transformation model is a horizontal style transformation model, wherein a first horizontal position style value is determined for the semantically indicated top level of the semantic model, and a second horizontal position style value is determined for the semantically indicated subordinate level of the semantic model, wherein the first horizontal position style value is applied to the parent graphic object, and the second horizontal position style value is applied to the child graphic object.

13. The computer-readable storage medium of claim 9, wherein the style transformation selection is a vertical flow selection, wherein the style transformation model is a vertical style transformation model, wherein a first vertical position style value is determined for the semantically indicated top level of the semantic model, and a second vertical position style value is determined for the semantically indicated subordinate level of the semantic model, wherein the first vertical position style value is applied to the parent graphic object, and the second vertical position style value is applied to the child graphic object.

14. The computer-readable storage medium of claim 9, wherein the style transformation selection is a bullet flow selection, wherein the style transformation model is a bullet style transformation model, wherein a first bullet position style value is determined for the semantically indicated top level of the semantic model, and a second bullet position style value is determined for the semantically indicated subordinate level of the semantic model, wherein the first bullet position style value is applied to the parent graphic object, and the second bullet position style value is applied to the child graphic object.

15. The computer-readable storage medium of claim 9, wherein the style transformation selection is an accent flow selection, wherein the style transformation model is a accent style transformation model, wherein a first accent style value is determined for the semantically indicated top level of the semantic model, and a second accent style value is determined for the semantically indicated subordinate level of the semantic model, wherein the first accent style value is applied to the parent graphic object to cause the parent graphic object to be displayed as a first shape, and the second accent style value is applied to the child graphic object to cause the child graphic object to be displayed as a second shape.

16. The computer-readable storage medium of claim 9, wherein the style transformation selection is three-dimensional flow selection, wherein the style transformation model is a three-dimensional transformation model, wherein a three dimensional style value is determined for the semantically indicated top level of the semantic model, the semantically indicated subordinate level of the semantic model and the semantically indicated connection between the top level and the subordinate level, wherein the three-dimensional style value is applied to the parent graphic object, the child graphic object and the transition graphic object.

17. A system for changing the style of a graphics chart, the instructions comprising:
a processor; and
a memory having computer-executable instructions stored thereon, the computer-executable instructions being configured for:
generating a graphic chart in a first portion of a display of a diagramming application, wherein the graphic chart includes a parent graphic object, and a child graphic object;
automatically generating a semantic model based on the generated graphic chart in a second portion of a display of the diagramming application, the semantic model configured to describe the organization of the graphic chart by displaying text strings within the graphic chart in a hierarchical format, wherein a parent text string of the parent graphic object is semantically indicated in the hierarchical format as a top level, wherein a child text string of the child graphic object is semantically indicated in the semantic model as a subordinate level indented in relation to the top level;
receiving a style transformation selection from a user interface;
accessing a style transformation model based on the style transformation selection, the style transformation model including style values for configuring the style of the graphics chart;
generating a style transformation definition, wherein the style transformation definition is generated by identifying the semantically indication top level of the semantic model, and identifying the semantically indicated subordinate level of the semantic model, wherein a style value is determined from the style transformation model based on the semantically indicated top level of the semantic model, and the semantically indicated subordinate level of the semantic model;
applying the generated style transformation definition to the graphic chart to render the graphic chart according to the style value of the style transformation definition, wherein the determined style value is applied to the parent graphic object, and the child graphic object; and
receiving a change to modify the child text string semantically indicated in the semantic model in the second portion of the display of the diagramming application, wherein, in response to the second change, automatically changing text of the child graphic object in the graphic chart in the first portion of the display of the diagramming application to reflect the second change.

18. The system of claim 17, wherein the style transformation selection is a horizontal flow selection, wherein the style transformation model is a horizontal style transformation model, wherein a first horizontal position style value is determined for the semantically indicated top level of the semantic model, and a second horizontal position style value is determined for the semantically indicated subordinate level of the semantic model, wherein the first horizontal position style value is applied to the parent graphic object, and the second horizontal position style value is applied to the child graphic object.

19. The system of claim 17, wherein the style transformation selection is a vertical flow selection, wherein the style transformation model is a vertical style transformation model, wherein a first vertical position style value is determined for the semantically indicated top level of the semantic model, and a second vertical position style value is determined for the semantically indicated subordinate level of the semantic model, wherein the first vertical position style value is applied to the parent graphic object, and the second vertical position style value is applied to the child graphic object.

20. The system of claim 17, wherein the style transformation selection is a bullet flow selection, wherein the style transformation model is a bullet style transformation model, wherein a first bullet position style value is determined for the semantically indicated top level of the semantic model, and a second bullet position style value is determined for the semantically indicated subordinate level of the semantic model, wherein the first bullet position style value is applied to the parent graphic object, and the second bullet position style value is applied to the child graphic object.

21. The system of claim 17, wherein the style transformation selection is an accent flow selection, wherein the style transformation model is a accent style transformation model, wherein a first accent style value is determined for the semantically indicated top level of the semantic model, and a second accent style value is determined for the semantically indicated subordinate level of the semantic model, wherein the first accent style value is applied to the parent graphic object to cause the parent graphic object to be displayed as a first shape, and the second accent style value is applied to the child graphic object to cause the child graphic object to be displayed as a second shape.

22. The system of claim 17, wherein the style transformation selection is three-dimensional flow selection, wherein the style transformation model is a three-dimensional transformation model, wherein a three dimensional style value is determined for the semantically indicated top level of the semantic model, the semantically indicated subordinate level of the semantic model and the semantically indicated connection between the top level and the subordinate level, wherein the three-dimensional style value is applied to the parent graphic object, the child graphic object and the transition graphic object.

\* \* \* \* \*